(12) United States Patent
Fitzpatrick et al.

(10) Patent No.: US 7,099,862 B2
(45) Date of Patent: Aug. 29, 2006

(54) PROGRAMMATIC DISCOVERY OF COMMON CONTACTS

(75) Inventors: Gregory P. Fitzpatrick, Keller, TX (US); David B. Lebowitz, North Richland Hills, TX (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 09/921,856

(22) Filed: Aug. 2, 2001

(65) Prior Publication Data

US 2003/0028526 A1 Feb. 6, 2003

(51) Int. Cl.
*G06F 17/30* (2006.01)

(52) U.S. Cl. ................... 707/3; 707/2; 707/1

(58) Field of Classification Search .............. 707/10, 707/102, 104; 709/203, 204, 205, 206, 230, 709/238; 705/26; 713/202; 455/412, 456
See application file for complete search history.

(56) References Cited

U.S. PATENT DOCUMENTS

| | | | | |
|---|---|---|---|---|
| 6,065,012 A * | 5/2000 | Balsara et al. | ............... | 707/102 |
| 6,073,138 A * | 6/2000 | de l'Etraz et al. | ....... | 707/104.1 |
| 6,108,651 A * | 8/2000 | Guha | ............................ | 707/4 |
| 6,643,686 B1 * | 11/2003 | Hall | ............................ | 709/206 |
| 6,876,983 B1 * | 4/2005 | Goddard | ....................... | 705/37 |
| 2001/0027474 A1 * | 10/2001 | Nachman et al. | ............ | 709/204 |
| 2001/0034224 A1 * | 10/2001 | McDowell et al. | .......... | 455/412 |
| 2002/0016857 A1 * | 2/2002 | Harari | ........................ | 709/238 |
| 2002/0023230 A1 * | 2/2002 | Bolnick et al. | .............. | 713/202 |
| 2002/0035605 A1 * | 3/2002 | McDowell et al. | .......... | 709/206 |
| 2002/0042772 A1 * | 4/2002 | Rudman et al. | ............... | 705/38 |
| 2002/0083136 A1 * | 6/2002 | Whitten | ....................... | 709/205 |
| 2002/0098849 A1 * | 7/2002 | Bloebaum et al. | ........... | 455/456 |
| 2002/0178087 A1 * | 11/2002 | Henderson et al. | ............ | 705/26 |
| 2003/0167279 A1 * | 9/2003 | Smiga et al. | ................ | 707/102 |

OTHER PUBLICATIONS

Dept. of Computer Science, School of Engineering, UVA. How the Oracle of Bacon Works. 1996. (retrieved Sep. 21, 2005).*
Wikipedia Org. and Web Archive.org. SixDegrees.com. 1997-2001. (retrieved Sep. 21, 2005).*

* cited by examiner

*Primary Examiner*—Jeffrey Gaffin
*Assistant Examiner*—Neveen Abel Jalil
(74) *Attorney, Agent, or Firm*—Akerman Senterfitt

(57) ABSTRACT

A common contact identification system. The common contact identification system can include at least two contact lists, a comparator for comparing contacts in each of the contact lists, and a common contact list including contacts matched by said comparator. Each contact list can include a plurality of contacts. Each contact list further can have a publicly accessible interface through which the contacts can be accessed remotely. As such, the comparator can identify matching contacts in each of the contact lists.

17 Claims, 3 Drawing Sheets

PROGRAMMATIC DISCOVERY OF COMMON CONTACTS

BACKGROUND OF THE INVENTION

1. Technical Field

This invention relates generally to methods and systems for programmatically discovering common contacts, including business, professional and personal contacts.

2. Description of the Related Art

People and businesses prefer to associate with people and businesses with which they are familiar. In the case where one who is searching for a person or business cannot find a person or business with whom the searcher is familiar, it is usually desired by the searcher to associate with one that is recommended by or at least known to someone who is also known by the searcher. This is particularly the case in the area of social or business introductions and networking. People must meet in order to build a relationship which will promote collaboration.

People are often reluctant to approach another person of interest without an introduction by a third party who has at least some knowledge of both people. Even where someone is recognized by their appearance, their identity may be unknown and uncertain, and an introduction never occurs. It is frequently the case that persons or entities that do not know one another have common contacts; however, as this fact remains unknown to either party, introductions still do not occur. In order to determine if one's friends or business acquaintances know of a person or business, the searcher must frequently call or correspond with several people in order to obtain a name of a person or business known to an acquaintance. This can be tedious, time consuming and intrusive on the time of others, such that many do not attempt to obtain such a referral.

SUMMARY OF THE INVENTION

The present invention is a method for generating a list of common contacts. The method can include the steps of first retrieving a plurality of contacts from an exposed, remotely accessible contact list; first comparing the first retrieved contacts to stored contacts in a locally accessible contact list; first identifying common contacts among the first compared contacts; second retrieving a plurality of contacts from an exposed, remotely accessible contact list associated with one of the first retrieved contacts; second comparing the second retrieved contacts to the locally stored contacts; second identifying common contacts among the second compared contacts; and, storing the identified common contacts in a list of common contacts. Importantly, the list of contacts can be stored locally or remotely, so long as the list of contacts can be accessed locally.

Importantly, this process can repeat for each contact retrieved in the first list for which no match is identified. Hence, the method can further include the step of repeating the second retrieving, second comparing and second identifying steps for each first retrieved contact not identified as a common contact in the first identifying step. Also, the second retrieving step can include the step of second retrieving a plurality of contacts from an exposed, remotely accessible contact list associated with one of the first retrieved contacts not identified as a common contact in the first identifying step.

In a second aspect of the present invention, a method generating a list of common contacts also can include the steps of: exchanging contact lists over a physical communications link; comparing contacts in the exchanged contact lists to identify matching contacts; and, storing the matched contacts in a common contact list. The exchanging step can include the steps of: establishing a wireless communications link; and, exchanging the contact lists over the established wireless communications link. Finally, in yet another aspect of the present invention, a method of generating a list of common contacts, can include the steps of: accessing a contact list in a remotely accessible database of contacts; comparing contacts in the contact list with contacts in a stored database of contacts, the comparison producing matching contacts; and, providing a visual hyperlink for each matching contact produced by the comparing step. Importantly, the list of contacts can be stored locally or remotely, so long as the list of contacts can be accessed locally.

The present invention also can include a common contact identification system. A common contact identification system can include at least two contact lists, a comparator for comparing contacts in each of the contact lists, and a common contact list including contacts matched by said comparator. Each contact list can include a plurality of contacts. Each contact list further can have a publicly accessible interface through which the contacts can be accessed remotely. As such, the comparator can identify matching contacts in each of the contact lists.

In the system of the present invention, each contact list can be stored in a storage medium selected from the group consisting of a database, a contact management program data store, an e-mail program address book, an instant messenger address book, a cellular phone address book and a personal digital assistant address book. Moreover, the system can further include a communications link between the contact lists over which the contacts in the contact lists can be transmitted. The communications link can be one of an infrared communications link, a short range radio frequency communications link, and a TCP/IP wireline link. Finally, the common contact list can include at least one hyperlinked address of a matched contact.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
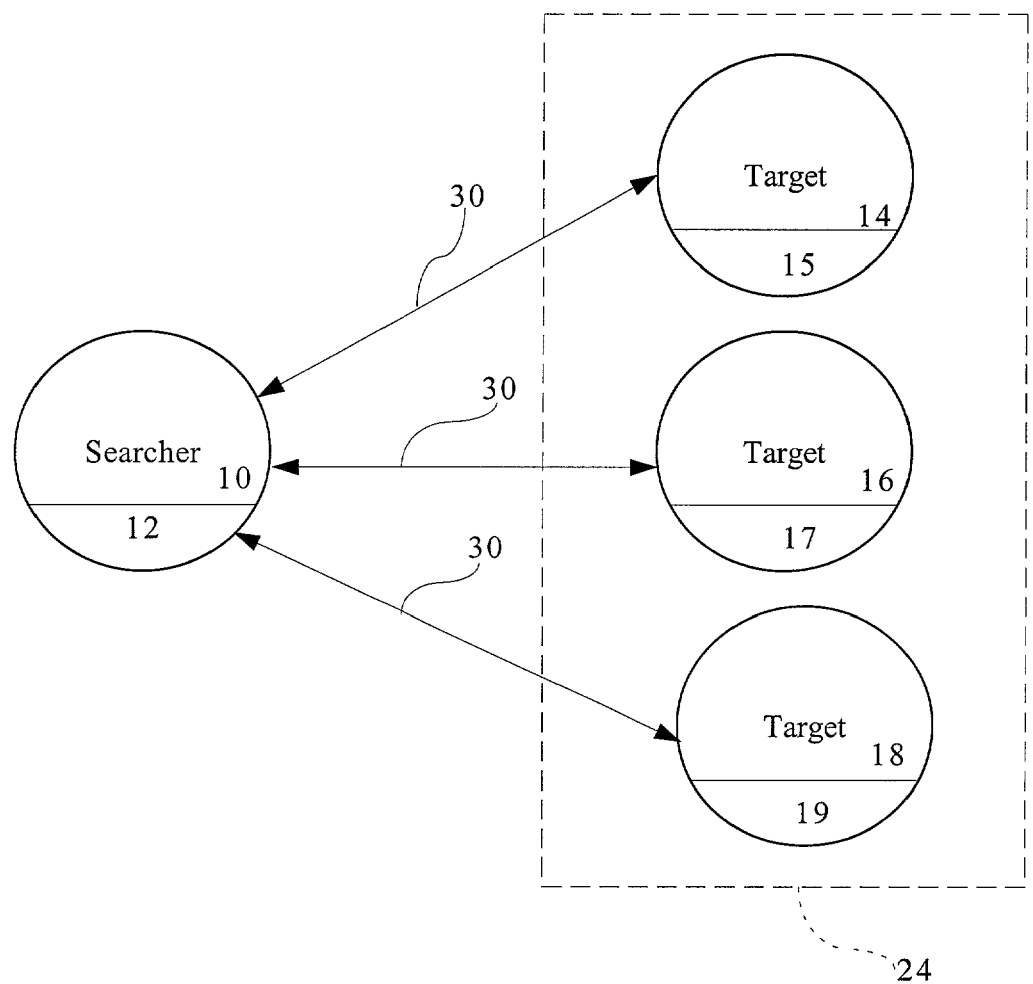
FIG. 1 is a schematic diagram of a method and system according to the invention.

The present invention is a method and system for generating lists of common contacts through which people, in a business or social context, can establish relationships with one another. A system which has been configured according to the present invention can be used to promote collaboration between parties by fostering trust when they discover one or more common contacts known and trusted by each party. Thus, the method and system of the present invention can be used to programmatically identify common contacts between parties thereby enhancing knowledge about each other and engendering a sense of trust. Through this sense of trust, the exchange of information and collaboration can be facilitated.

In the present invention, personal contact information which has been organized into contact lists can be published. By publishing contacts lists, the contacts contained therein can be publicly exposed to others who might establish contact with others in order to discover common contacts. Notably, the contact lists can be in the form of electronically stored personal address books, buddy lists commonly associated with instant messenger clients, contact lists often used in e-mail programs, address books provided with personal digital assistants, cell phone contact lists and phone books used to store contacts in a cellular phone, etc.

In operation, a method for generating a list of common contacts can include the steps of publishing a contact list containing contacts; accessing the contact list of another, comparing the contacts in each of the published contact list and the accessed contact list to identify matching contacts; and, providing an identifier for each matched contact. In the present invention, searchers can search for common contacts in accordance with the inventive method. Likewise, targets can provide a publicly accessible interface to an associated contact list with which searchers can identify common contacts. The searcher, the target and the contacts can be persons. Moreover, the searcher, the target and the contacts also can be businesses or business entities. Finally, the searcher, the target and the contacts can be in any combination of persons and/or business entities.

Each contact can itself be a target with a set of contacts of its own. Notably, when searching for common contacts among the contact lists of the searcher and the target, the contacts in contact lists associated with the target also can be searched in the same manner to determine whether the searcher and target share "friends of friends". This process can repeat for every contact in the contact list associated with the target. Alternatively, this process can repeat only for those contacts in the contact list of the target for which no match has been identified. Finally, the process optionally can continue for additional layers of contacts—"friends of friends of friends" and so on.

The contacts can be provided from any suitable source. In one aspect, the contacts of the targets are created and assembled in a dedicated database. In another aspect, the contacts are provided from existing sources such as personal address books, e-mail address books and instant messaging address books. The database of contacts of each target can be searched by the searcher by suitable methods. In one aspect, the database of the target is transmitted to the searcher. In another aspect, there is an exchange of databases between searcher and target, in which case both parties are both searchers and targets. The transmission of data can be performed by suitable methods. In one aspect, the transmission is performed by infrared port-to-port transmission. In another aspect, the transmission is performed by narrowcasting. In another aspect, the contact list of the targets is searched on a public portal server.

The method and system of the invention are shown in FIG. 1. A searcher 10 has a database of contacts 12. Targets 14, 16, and 18 have respective contact databases 15, 17, and 19. Although three targets are shown, it will be appreciated that any number of targets can be searched by each searcher 10. Also, although the contact databases for the target are shown as individual databases, such could be combined in a single database 24 and searched through suitable means such as a public portal server.

Figure 2:
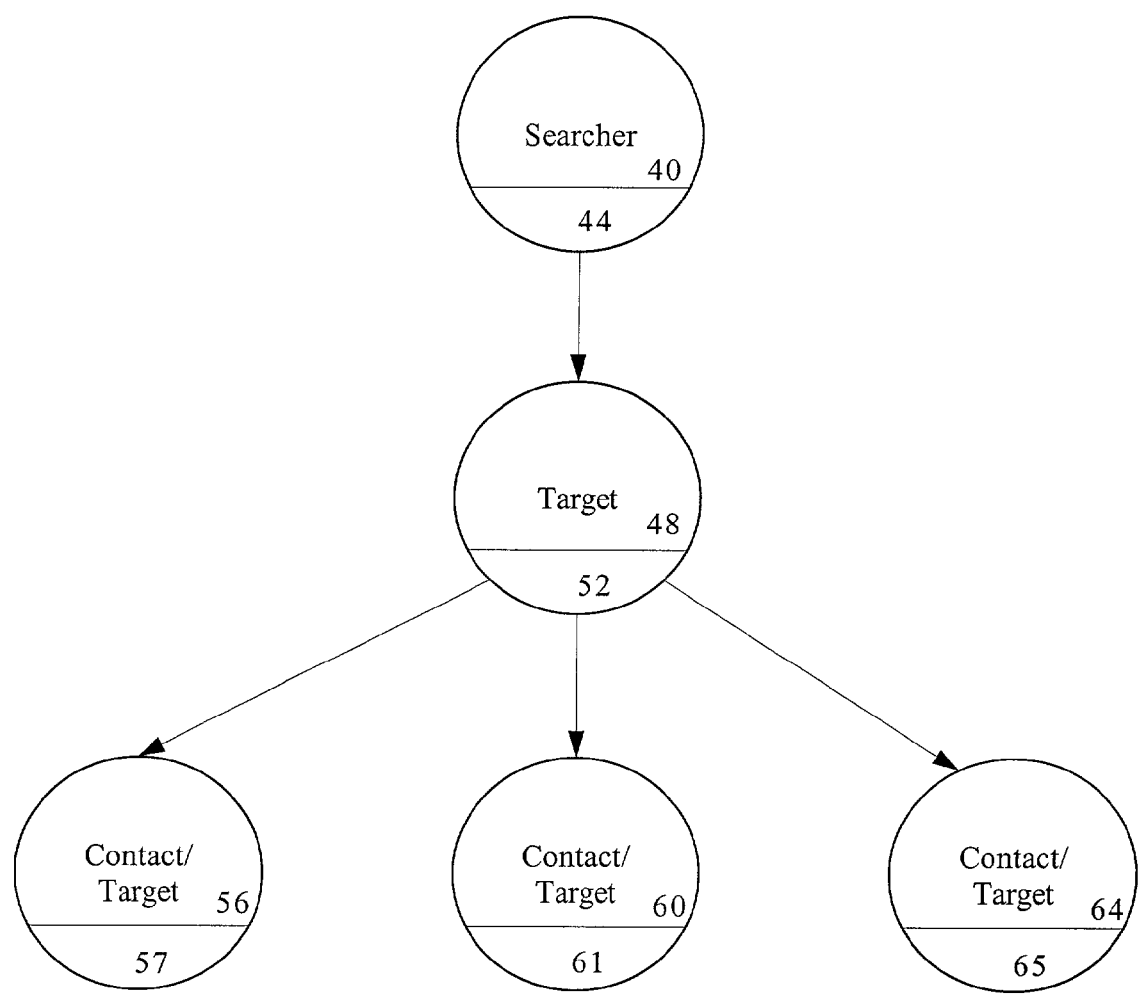
FIG. 2 is a schematic diagram of an alternate method and system according to the invention.

Transmission of the data for searching can be by suitable methods. This transmission can be by any suitable method and, as indicated by the arrows 30, can be an exchange of data between searcher and target such that each searcher is also a potential target and each target is a potential searcher. In some instances, a target will not have contacts in the respective target database which matches any of the contacts of the searcher 10. In this instance, further searching can be performed. There is shown in FIG. 2, a search method and system to perform such searching. The searcher 40 having a database of contacts 44 searches a target 48 having a database of contacts 52. The database of contacts 52 for target 48 includes contacts 56, 60, and 64. The contacts 56, 60, and 64 each have a respective database of contacts 57, 61, and 65. Each respective database of contacts 57, 61 and 65 for the contacts 56, 60, and 64 are then searched to determine if there is a match with the database of contacts 44 for the searcher 40. In this manner, the search proceeds through contacts of contacts such that the nearest contact to the searcher 40 is determined.

The location of a match requires that the searcher be notified that a match has occurred. Further, the searcher must receive an identifier of the target. The identifier can be suitable identification information such as name, address, email address, telephone number, and the like. It is not necessary, however, that the identity of the target be disclosed. For example, the identifier can provide only a means of communicating with the target, without the disclosure of the identity of either the searcher or the target. Any suitable method of communication can be provided, such as e-mail, instant messaging, and a voice and/or video communications link, although other methods of communication could be utilized. The system can permit the parties to disclose their respective identities only when such is desired.

Figure 3:
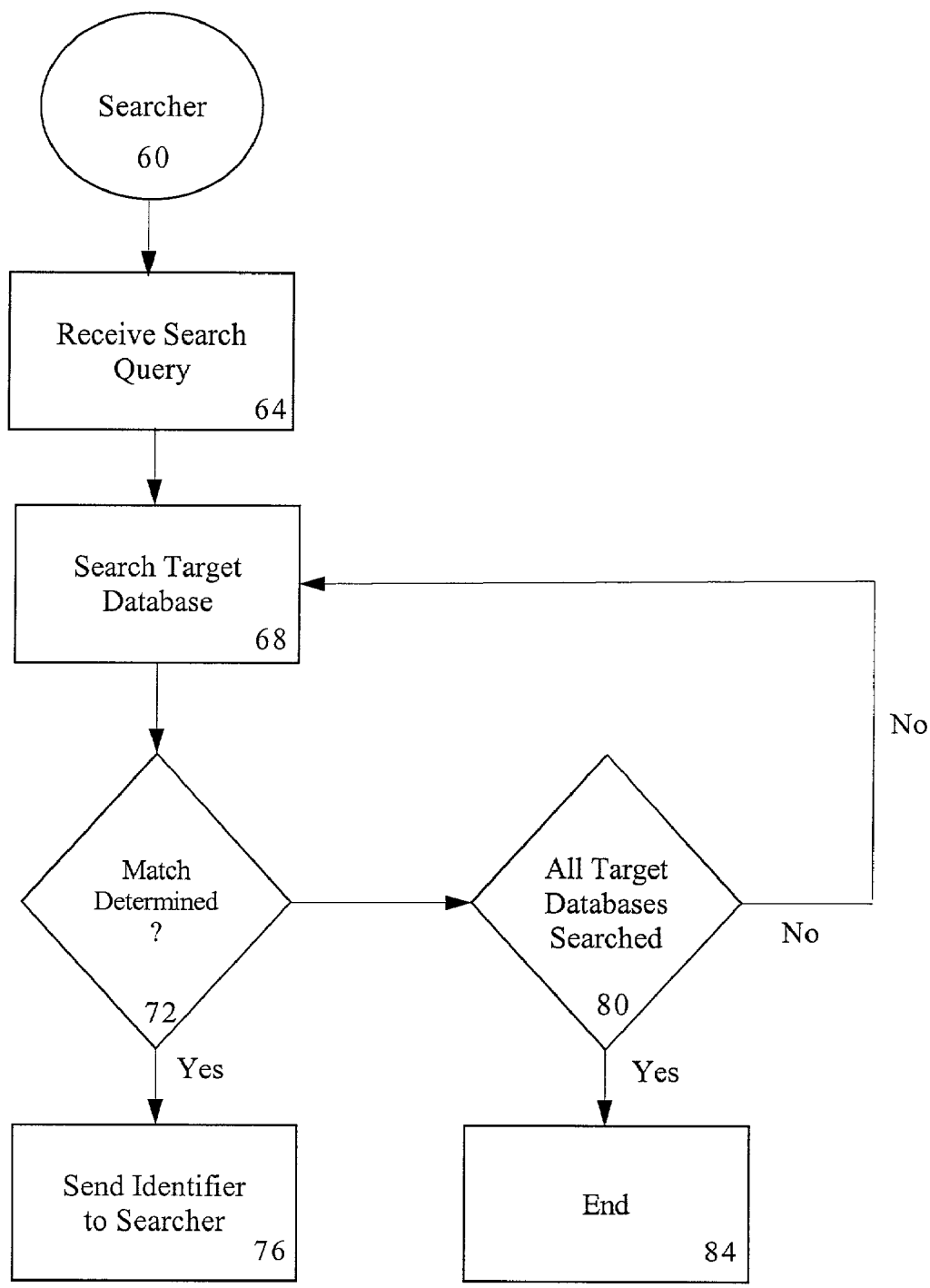
FIG. 3 is a flow chart diagram of a method for performing the invention.

A method for performing the invention is disclosed in FIG. 3. The searcher 60 provides a search query 64. A target database of contacts is searched in step 68. The target database of contacts is compared with the database of contacts of the searcher 60 in step 72 to determine if there is a match. If so, an identifier is sent to the searcher in step 76. If not, it is determined if the databases of contacts for all targets have been searched in step 80. If not, the next target database of contacts is searched in step 68. If so, the search ends in step 84. It is alternatively possible to search the databases of contacts for all targets, notwithstanding that a match has been made. This will provide the searcher with all matches.

This invention can be embodied in other forms without departing from the spirit or essential attributes thereof; and, accordingly, reference should be had to the following claims, rather than to the foregoing specification, as indicating the scope of the invention.

We claim:

1. A computerized method of generating a list of common contacts, comprising the steps of:

exchanging at least two contact lists over a physical communications link, wherein each contact list is stored in a distinct database and defines a distinct set different from the other and corresponds to a different user;

comparing contacts in said exchanged contact lists to identify matching contacts; and, generating and storing in a common contacts database a contact list defining yet another distinct set and containing said matched contacts.

2. The method of claim 1, wherein said exchanging step comprises the steps of:
- establishing a wireless communications link; and,
- exchanging said contact lists over said established wireless communications link.

3. A computerized method of generating a list of common contacts, comprising the steps of:
- accessing a contact list defining a set being stored in a remotely accessible database of contacts;
- comparing contacts in said contact list with contacts in a stored database of contacts defining another distinct set, said contact list and said contacts in a stored database of contacts each corresponding to a different user;
- producing matching contacts as a result of said comparing; and
- providing a visual hyperlink for each matching contact produced by said comparing step, wherein said hyperlinked matching contacts define a third set.

4. A computerized method of generating a list of common contacts, comprising the steps of:
- first retrieving a plurality of contacts from an exposed, remotely accessible contact list stored in a first database, the exposed, remotely accessible contact list defining a first set associated with a user;
- first comparing said first retrieved contacts to contacts contained in a locally accessible contact list stored in a second database, said locally accessible contact list defining a second set distinct from said first set and associated with a different user;
- first identifying common contacts among said first compared contacts;
- second retrieving a plurality of contacts from an exposed, remotely accessible contact list associated with one of said first retrieved contacts stored in a third database;
- second comparing said second retrieved contacts to said locally stored contacts;
- second identifying common contacts among said second compared contacts; and,
- generating and storing a common contacts list in a common contacts database, the common contacts list defining yet another distinct set and containing said identified common contacts.

5. The method of claim 4, further comprising the step of repeating said second retrieving, second comparing and second identifying steps for each first retrieved contact not identified as a common contact in said first identifying step.

6. The method of claim 4, wherein said second retrieving step comprises the step of second retrieving a plurality of contacts from an exposed, remotely accessible contact list associated with one of said first retrieved contacts not identified as a common contact in said first identifying step.

7. A common contact identification system comprising:
- at least two contact lists stored in separate databases, each said contact list defining a distinct set comprising a plurality of contacts, each said contact list having a publicly accessible interface through which said contacts are accessed remotely, each said contact list corresponding to a different user;
- a comparator comparing contacts in each of said at least two contact lists, said comparator identifying matching contacts in each of said at least two contact lists; and,
- a common contact list resulting from the comparison and defining yet another distinct set comprising contacts matched by said comparator, said matching contacts being stored in a common contacts database.

8. The system of claim 7, wherein each said contact list is stored in a storage medium selected from the group consisting of a database, a contact management program data store, an e-mail program address book, an instant messenger address book, a cellular phone address book and a personal digital assistant address book.

9. The system of claim 7, further comprising a communications link between said contact lists over which said contacts in said contact lists are transmitted.

10. The system of claim 9, wherein said communications link is selected from the group consisting of an infrared communications link, a short range radio frequency communications link, and a TCP/IP wireline link.

11. The system of claim 7, wherein said common contact list comprises at least one hyperlinked address of a matched contact.

12. A machine readable storage having stored thereon a computer program for generating a list of common contacts, said machine readable storage having a plurality of code sections executable by a machine to perform a series of steps, said steps comprising:
- identifying a contact list defining a set of contacts corresponding to a user;
- identifying at least one other contact list defining a different set of contacts corresponding to a different user,
- exchanging at least two of said contact lists over a physical communications link;
- comparing contacts in said exchanged contact lists to identify matching contacts; and,
- storing said matched contacts in a common contact list, said common contact list defining an additional distinct set of contacts.

13. The machine readable storage of claim 12, wherein said exchanging step comprises the steps of:
- establishing a wireless communications link; and,
- exchanging said contact lists over said established wireless communications link.

14. A machine readable storage having stored thereon a computer program for generating a list of common contacts, said machine readable storage having a plurality of code sections executable by a machine to perform a series of steps, said steps comprising:
- accessing a contact list in a remotely accessible database of contacts, said contact list defining a set of contacts corresponding to a user;
- comparing contacts in said contact list with contacts in a stored database of contacts defining a different set of contacts corresponding to a different user;
- producing matching contacts as a result of said comparing; and,
- providing a visual hyperlink for each matching contact produced by said comparing step.

15. A machine readable storage having stored thereon a computer program for generating a list of common contacts, said machine readable storage having a plurality of code sections executable by a machine to perform a series of steps, said steps comprising:
- first retrieving a plurality of contacts from an exposed, remotely accessible contact list, the exposed, remotely accessible contact list defining a first set associated with a user;
- first comparing said first retrieved contacts to stored contacts in a locally accessible contact list, said locally accessible contact list defining a second set distinct from said first set and associated with a different user;

first identifying common contacts among said first compared contacts;
second retrieving a plurality of contacts from an exposed, remotely accessible contact list associated with one of said first retrieved contacts;
second comparing said second retrieved contacts to said locally stored contacts;
second identifying common contacts among said second compared contacts; and,
generating and storing a common contacts list, the common contacts list defining yet another distinct set of contacts and containing said identified common contacts.

16. The machine readable storage of claim 15, further comprising the step of repeating said second retrieving, second comparing and second identifying steps for each first retrieved contact not identified as a common contact in said first identifying step.

17. The machine readable storage of claim 15, wherein said second retrieving step comprises the step of second retrieving a plurality of contacts from another exposed, remotely accessible contact list associated with one of said first retrieved contacts not identified as a common contact in said first identifying step.

* * * * *